United States Patent [19]
Bjorkholm et al.

[11] 4,047,026
[45] Sept. 6, 1977

[54] DEFLECTION OF ATOMIC BEAMS WITH ISOTOPE SEPARATION BY OPTICAL RESONANCE RADIATION USING STIMULATED EMISSION AND THE A.C. STARK EFFECT

[75] Inventors: John Ernst Bjorkholm, Holmdel; Paul Foo-Hung Liao, Middletown, both of N.J.

[73] Assignee: Bell Telephone Laboratories, Incorporated, Murray Hill, N.J.

[21] Appl. No.: 646,064

[22] Filed: Jan. 2, 1976

[51] Int. Cl.² ............................................... H01S 1/00
[52] U.S. Cl. ................................................. 250/251
[58] Field of Search ............... 250/251, 281, 282, 283, 250/284

[56] References Cited
U.S. PATENT DOCUMENTS

| | | | |
|---|---|---|---|
| 3,558,877 | 1/1971 | Pressman | 250/251 |
| 3,710,279 | 1/1973 | Ashbin | 250/251 |

OTHER PUBLICATIONS

"Deflection of Atomic Beams by Resonance Radiation Using Stimulated Emission," Nebenzahl, Applied Physics Letters vol. 25, No. 6, Sept. 15, 1974 pp. 327-329.

*Primary Examiner*—Craig E. Church
*Attorney, Agent, or Firm*—W. L. Wisner; D. Caplan

[57] ABSTRACT

Improved atomic beam deflection and improved isotope separation, even in vapors, is proposed by substituting the A.C. Stark effect for the baseband chirp of the pushing beam in the prior proposal by I. Nebenzahl et al, *Applied Physics Letters*, Vol. 25, page 327 (September 1974). The efficiency inherent in re-using the photons as in the Nebenzahl et al proposal is retained; but the external frequency chirpers are avoided. The entire process is performed by two pulses of monochromatic coherent light, thereby avoiding the complication of amplifying frequency-modulated light pulses. The A.C. Stark effect is provided by the second beam of coherent monochromatic light, which is sufficiently intense to chirp the energy levels of the atoms or isotopes of the atomic beam or vapor. Although, in general, the A.C. Stark effect will alter the isotope shift somewhat, it is not eliminated. In fact, the appropriate choice of frequencies of the pushing and chirping beams may even relax the requirements with respect to the isotope absorption line shift for effective separation. That is, it may make the isotope absorption lines more easily resolvable.

3 Claims, 4 Drawing Figures

DEFLECTION OF ATOMIC BEAMS WITH ISOTOPE SEPARATION BY OPTICAL RESONANCE RADIATION USING STIMULATED EMISSION AND THE A.C. STARK EFFECT

BACKGROUND OF THE INVENTION

This invention relates to atomic beam deflection techniques and to advanced coherent optical techniques for isotope separation.

Recently, a new radiation pressure technique for deflecting atomic or molecular beams or for separating isotopes was proposed by I. Nebenzahl et al, *Applied Physics Letters*, Vol. 25, page 327 (September 1974). Their scheme is inherently efficient as compared to radiation pressure techniques that use isotropic reradiation of absorbed energy, because their technique returns the reradiated energy as a coherent optical beam which may be re-used and actually increases the force that can be exerted on the atoms. The coherent reradiation is achieved by a chirped optical pulse which forms the "pushing" beam and produces an "adiabatic rapid passage" effect on the atoms, molecules or isotopes being pushed. The chirped pulse causes all of the atoms in the atomic beam with the correct transition frequency to go to the excited state, with each atom absorbing one photon. The pulse is reflected back through the atomic beam at the appropriate time interval, causing the atoms to return in a coherent fashion to the ground state by each emitting a photon. The double pass of the light through the atomic beam appears to be essentially a specular reflection of one photon from each atom. Hence, twice the momentum of the photon is transferred to the atom; and the atom's trajectory is deflected. The slight red shift of the light is insignificant to its re-use in such a chirped scheme.

We have recognized that it would be desirable to retain the inherent efficiency of the Nebenzahl et al proposal while avoiding the need for a baseband frequency-modulating field to achieve the necessary chirp and avoiding the need for amplifying frequency-modulated light pulses.

SUMMARY OF THE INVENTION

According to our invention, we have recognized that the desired improvement of atomic beam deflection or isotope separation by radiation pressure involving a coherent return beam can be achieved by employing a second beam of pulsed monochromatic coherent light. This second beam will then "chirp" the atomic energy levels of the species upon which radiation pressure is to be exerted. It is the A.C. Stark effect which produces this chirp.

Advantageously, while our technique is applicable to deflection of or isotope separation in atomic beams, it also is applicable to an atomic vapor if somewhat more intense beams are available.

To this end, several subsidiary features of our invention are proposed to make possible practical atomic beam deflection or isotope separation in either atomic beams or vapors. Specifically, a multiple pass collinear beam embodiment of our invention is disclosed. Also, suitable synchronization of the pulses of the two beams is described.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Figure 1:
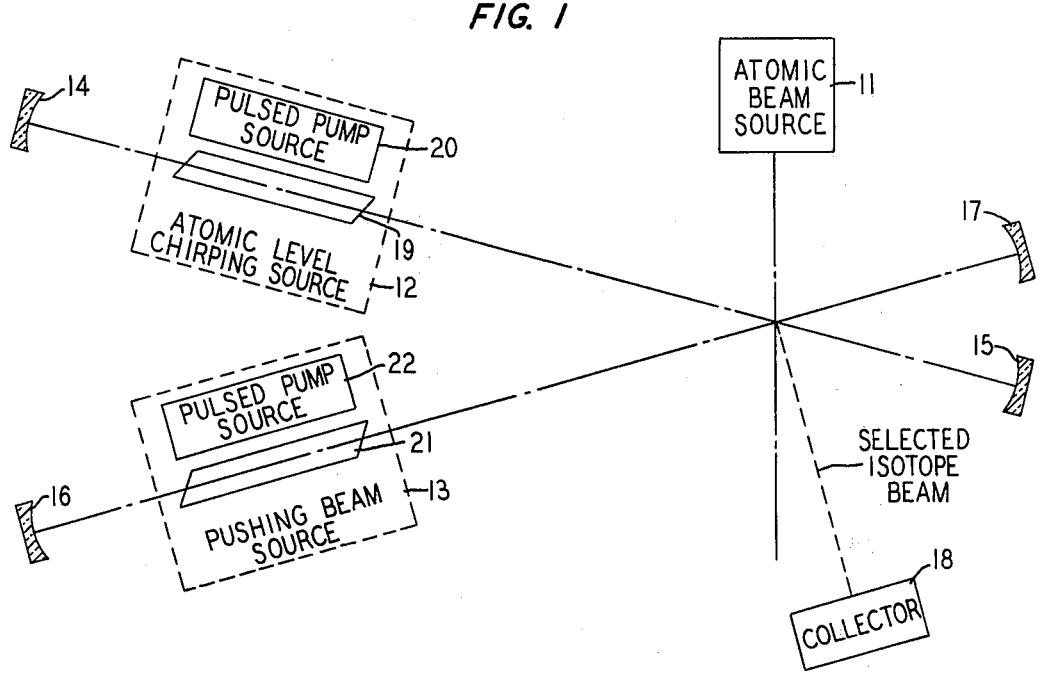
FIG. 1 is a partially pictorial, partially diagrammatic illustration of a basic embodiment of our invention.

In the embodiment of FIG. 1, the technique is modified and improved over that of the above-cited Nebenzahl et al reference by producing the needed chirp, via the A.C. Stark effect, specifically by supplying a second monochromatic coherent optical pulse that is capable of shifting the energy levels that are responsive to the first beam via absorption. Contrary to the intuitive feeling that such a substitution will produce less significant chirps than baseband frequency modulation of the pushing beam, we have discovered that such atomic energy level shifts can be easily obtained and are quite large in magnitude, as reported in our paper in *Physical Review Letters*, Volume 34, page 1 (Jan. 6, 1975).

Specifically, in FIG. 1 the atomic beam source 11 generates the atomic beam which is to be deflected. Illustratively, the atomic beam would include two isotopes of the same element; and it is desired to separate those isotopes. Disposed so that their axes intercept the atomic beam path at the same point are optical resonators 14, 15 and 16, 17. The pushing beam pulse is resonated by resonators 16, 17 and is supplied from a source 13 within that resonator, the source including laser element 21 and the pulsed pump source 22 for the laser element 21. The chirping beam source 12 is disposed within the resonator 14, 15 and includes the laser element 19 and pulsed pump source 20.

As contrasted to the operation of the apparatus of the above-cited Nebenzahl et al reference, the operation of the embodiment of FIG. 1 is unique in that the pulse circulating in resonator 14, 15 from source 12 is a monochromatic coherent optical pulse which shifts the energy levels of the selected isotope in the atomic beam from source 11 by means of the A.C. Stark effect.

For example, assume for the moment that there are three pertinent energy levels in the selected isotope of the atomic beam, two of which are separated by the photon energy of source 13, the third level being separated from the second level by the photon energy of the chirping beam from source 12. To be more precise, it is desirable that the separation of the first two levels be somewhat greater (smaller) than the photon energy of the pushing beam and that the separation of the second and third levels be somewhat greater (smaller) than the photon energy of the chirping beam.

Then, as we increase the intensity of the light from the chirping beam source 12

$$\Omega_{21} \rightarrow E_{02} - E_{01} - \alpha I_2/(\Omega_{32} - \omega_2), \quad (1)$$

where $\Omega_{21}$ and $\Omega_{32}$ are the respective separations of energy levels in the species of interest, $\omega_1$ and $\omega_2$ are the frequencies of the pushing and chirping beams respectively, $E_{02}$ and $E_{01}$ are the unperturbed energies of the levels to be chirped, and $\alpha$ is a proportionality constant. $I_2$ is the intensity of the light at $\omega_2$. The light at $\omega_2$ can cause the separation $\Omega_{21}$ to sweep through $\omega_1$; and hence the system can achieve the adiabatic rapid passage. Clearly, the chirping pulse should have a monotonically increasing or decreasing intensity. The starting conditions described with each beam off resonance from the separation of the pertinent levels are necessary in order to insure that all the atoms of a desired isotope start out in the same energy level, for most efficient separation.

Beyond the properties just described, the techniques of the separation are essentially like those described in the above-cited article by I. Nebenzahl et al.

In addition to the large energy shifts which we now recognize to be obtainable and the avoidance of baseband frequency modulation and subsequent amplification, our proposal may have the additional advantage of offering additional selectivity among isotopes as compared to the technique of Nebenzahl et al since the magnitude and direction of the energy level shift depends on the relationship between $\Omega_{32}$ and $\omega_2$. One can choose this relationship so that only the correct isotope will have the correct sweep to pass through resonance; and hence the requirements for resolving the transition between the first and second levels of different isotopes can be relaxed.

It is clear that, in the embodiment of FIG. 1, the intersection of the optical beams does not necessarily track the deflected atomic beam as the isotopes are progressively separated. Moreover, the use of very broad optical beams may reduce the intensity levels of the optical beams below the levels most desirable. Accordingly, an improved multiple pass modification of the emdodiment of FIG. 1 may be devised as shown in FIG. 2.

Figure 2:
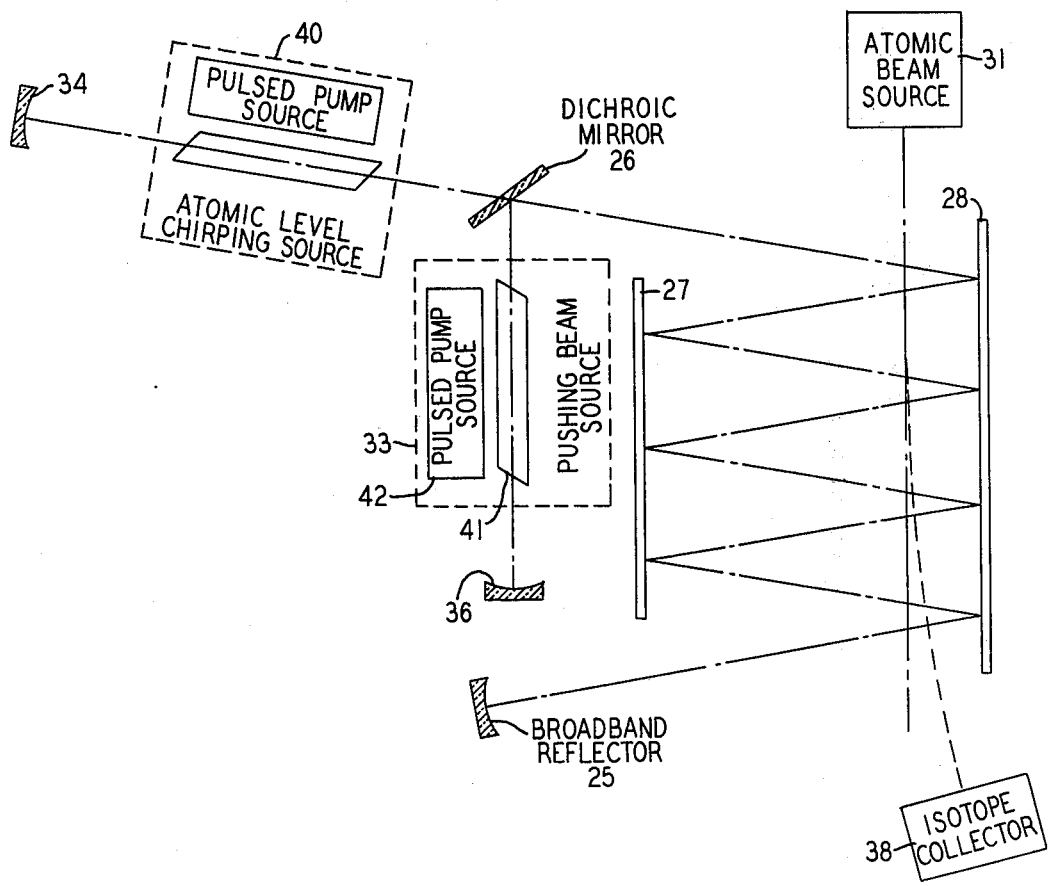
FIG. 2 is a modification of the embodiment of FIG. 1 to provide multiple passes of the chirping and pushing pulses through an atomic beam to be deflected.
Figure 3:
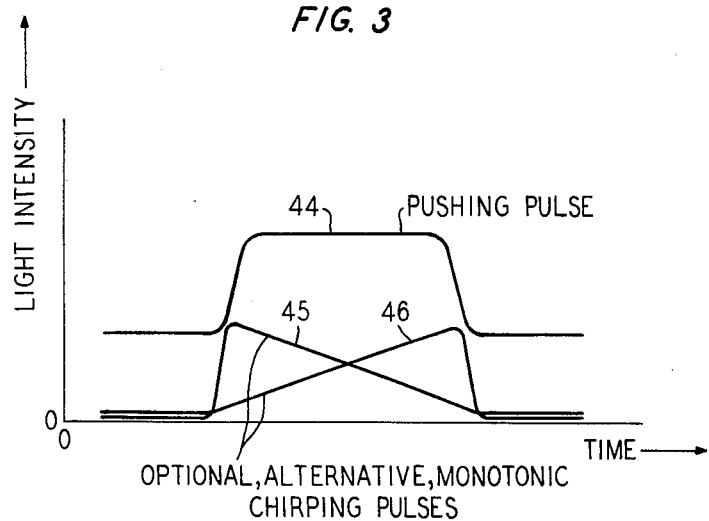
FIG. 3 shows curves illustrating the synchronization of the chirping and pushing pulses.

In FIG. 2, the pushing and chirping beams are made collinear by combining them at one surface of a dichroic mirror 26. That is, the chirped beam from source 40 passes through mirror 26, which is transparent for the frequencies of the chirped beam, and the pushing beam from source 33 is reflected from mirror 26, which is highly reflective for the frequencies of the pushing beam. The optical resonators 34, 25 and 36, 25 of the respective sources are multiply folded across the path of the beam from the atomic beam source 31 by the interferometer comprising reflectors 27 and 28, which are essentially or nearly parallel and disposed so that the atomic beam propagates, at least initially, at the optimum distance from reflector 28 for the adiabatic rapid passage process. In other words, twice the propagation times of the optical beams from the atomic beam to reflector 28 is less than the lifetime of the population-inverted species in its excited state, so that the coherent reradiation of the pushing beam is achieved at every second passage thereof through the atomic beam. Reflector 28 can be curved to take account of the path of the deflected species. Both reflectors could be focusing reflectors to maximize the useful light intensity. The reradiated pushing beam then propagates collinearly with the chirping beam to reflector 27 and back toward the atomic beam. It will then interact with the atomic beam at a slightly different frequency in the chirp of the energy levels by the other beam because of the Doppler shift produced by the fact that the deflected isotope is reducing from reflector 27. The slight red shift of the pushing beam is inconsequential, as compared to this Doppler shift; and the chirp covers a sufficiently broad frequency band. The synchronization of the pushing pulse 44 and the chirping pulse, shown in alternative forms 45 or 46, is shown in FIG. 3 and needs no further explanation in view of the above-stated desirability of having all atoms of the selected species in the same initial energy state before each double passage of the light beams.

Figure 4:
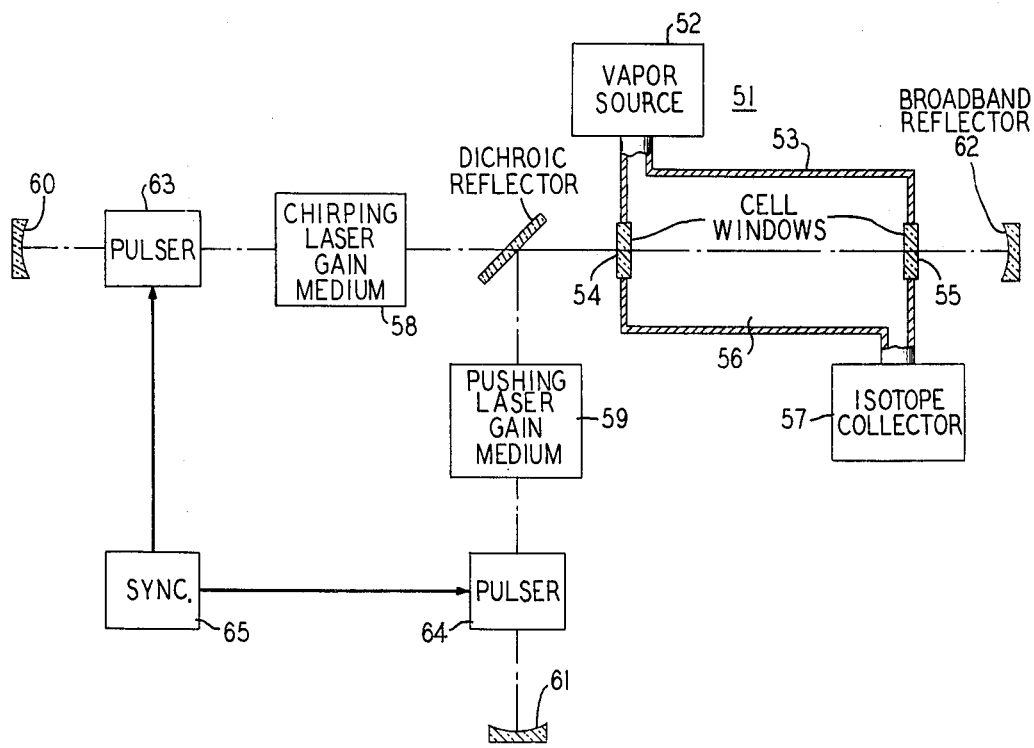
FIG. 4 shows another embodiment of the invention applicable to isotope separation in a vapor.

While clearly the technique of the embodiments of FIGS. 1 and 2 can be applied to atomic vapors only by substantially increasing the intensity of the beams and while broadening of the line widths must be small enough that the isotopic line widths are still resolved, in other respects, the embodiment of FIG. 4 shows explicitly means 63, 64 and 65 for synchronizing the pulses of the chirping and pushing beam sources. Also, the atomic beam source is replaced by the apparatus 51 which includes the cell 53 with windows 54 and 55 aligned on the common leg of the two resonators 60, 62 and 61, 62, vapor source 52, and the collector 57 for the selected isotope which is subjected to the radiation pressure.

It is not necessary for the atomic beam or isotope mixture to be within the laser resonators, as illustrated in the drawings. Instead, it is feasible to use a separate resonator about the isotope mixtures. Indeed, even if the isotope separation occurs in no resonator, advantages over earlier isotope separation methods using radiation pressure are retained, especially as to the strength and selectivity of the radiation pressure force, even though some efficiency is lost.

It follows that the chirping laser and pushing laser need not be pulsed directly. The alternative is to place amplitude modulators between them and the isotope mixture. In other words, any means for forming the pulses is sufficient.

What is claimed is:

1. A method for separation of isotopes comprising the steps of supplying a mixture of the desired isotope and at least one isotope not desired to an interaction region, supplying a first coherent optical beam that is pulsed and selected for resonance radiation interaction, whereby a force is to be exerted on the selected isotope, the frequency of said first source being offset from the resonance by a selected amount, supplying to said mixture a second coherent optical beam that is pulsed with sufficient intensity to Stark-shift the resonance transition through coincidence with the photon energy of the first source, said second optical beam having a chirp rate of optical intensity that is appropriate for adiabatic rapid passage, and providing two sequential oppositely-directed passes of the first beam through the mixture coincident with appropriate Stark shifts produced by the second beam, yielding absorption by the selected isotope on the first pass and stimulated re-emission by the selected isotope on the second pass.

2. A method according to claim 1 including the additional step of reapplying at least once to the mixture the re-emitted beam after a time interval to exert additional force on the selected isotope.

3. A method according to claim 1 in which the step of supplying to the mixture the second coherent optical beam includes varying the intensity thereof monotonically with a synchronization with respect to the supplying of the first beam to maximize the uniformity of excitation state of the atoms of the selected isotope.

* * * * *